(12) United States Patent
Lindoff et al.

(10) Patent No.: US 9,094,809 B2
(45) Date of Patent: Jul. 28, 2015

(54) TECHNIQUE FOR MANAGING ACTIVITY STATES FOR MULTIPLE SUBSCRIPTIONS IN A TERMINAL DEVICE

(75) Inventors: Bengt Lindoff, Bjärred (SE); Bo Lincoln, Lund (SE); Johan Nilsson, Höllviken (SE); Christer Östberg, Staffanstorp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 218 days.

(21) Appl. No.: 13/996,240

(22) PCT Filed: Dec. 12, 2011

(86) PCT No.: PCT/EP2011/072450
§ 371 (c)(1),
(2), (4) Date: Sep. 18, 2013

(87) PCT Pub. No.: WO2012/084574
PCT Pub. Date: Jun. 28, 2012

(65) Prior Publication Data
US 2014/0004842 A1    Jan. 2, 2014

Related U.S. Application Data

(60) Provisional application No. 61/432,004, filed on Jan. 12, 2011.

(30) Foreign Application Priority Data
Dec. 22, 2010   (EP) ..................... 10015947

(51) Int. Cl.
*H04M 3/00* (2006.01)
*H04W 8/18* (2009.01)
*H04W 88/06* (2009.01)

(52) U.S. Cl.
CPC .............. *H04W 8/183* (2013.01); *H04W 88/06* (2013.01)

(58) Field of Classification Search
None
See application file for complete search history.

(56) References Cited

U.S. PATENT DOCUMENTS

2007/0123266 A1   5/2007   Polisetty et al.
2007/0287392 A1*  12/2007  Sagne et al. ............... 455/119
(Continued)

FOREIGN PATENT DOCUMENTS

| CN | 201349329 Y | 11/2009 |
|---|---|---|
| WO | 9962282 A1 | 12/1999 |
| WO | 2008011550 A1 | 1/2008 |

OTHER PUBLICATIONS
3rd Generation Partnership Project."DRX and DTX in LTE_Active." TSG-RAN WG2 Meeting #52, Tdoc No. R2-060967, Mar. 27-31, 2006, pp. 1-5, Athens, Greece.

*Primary Examiner* — Suhail Khan
(74) *Attorney, Agent, or Firm* — Murphy, Bilak & Homiller, PLLC

(57) ABSTRACT

A technique for managing activity states of at least two subscriptions in a terminal device is described. A method implementation of this technique performed in the terminal device comprises the steps of monitoring whether a first subscription is to transit or has transit from a first active state to a second active state while at least one second subscription is in a detached state, wherein the second active state is associated with a lower terminal activity than the first active state, if the result of the monitoring step is affirmative, waiting for a predetermined period of time, upon elapse of the predetermined period of time, if the first subscription is still in the second active state, triggering a transition of the first subscription from the second active state to an inactive state and initiating for the at least one second subscription a transition from a detached state to an inactive state.

22 Claims, 3 Drawing Sheets

(56) References Cited

U.S. PATENT DOCUMENTS

2009/0028084 A1 1/2009 Ping
2009/0131054 A1 5/2009 Zhang
2009/0215472 A1 8/2009 Hsu

* cited by examiner

TECHNIQUE FOR MANAGING ACTIVITY STATES FOR MULTIPLE SUBSCRIPTIONS IN A TERMINAL DEVICE

TECHNICAL FIELD

The present disclosure relates to a technique for managing activity states for at least two subscriptions in a terminal device. The subscriptions may be defined by Subscriber Identity Modules (SIMs).

BACKGROUND

Many of today's mobile terminal users have subscribed to more than one mobile communication service. For instance, such a user could have one private and one work-related subscription. In another case, such a user could have two different subscriptions for use in different areas (e.g., countries).

Accordingly, dual SIM terminal devices become increasingly popular. A dual SIM device is typically realized in the form of a mobile terminal which is capable of holding two SIM cards. Dual SIM operation allows the use of two subscriptions without the need of carrying two mobile terminals. For example, the same mobile terminal can be used for business and private purposes with separate numbers (and bills) or for travel, with an additional SIM for the country visited.

The most common dual SIM terminal devices are those of the dual standby-type, i.e., the device can—in standby—camp on two public land mobile networks (PLMNs) or cells, one for each active SIM. Furthermore, it is expected that multi-standby SIM devices capable of handling more than two SIM cards will be on the market soon.

However, in such a dual standby SIM device, only one subscription (and associated SIM) can be active at a time. That is, once one of the subscriptions is activated, the other subscription is deactivated. Hence, as long as one of the subscriptions is in an active state, the device can not be reached (or transmit) via the other subscription. This is attributed to the fact that a dual standby device only has one transceiver chain, and in case of active use of one subscription (and associated SIM), the entire transceiver chain is assigned to that subscription.

This fact especially poses a problem for data or e-mail services, for which the device can be in an active state quite a long time after actual transmission and reception operations have taken place. For instance, in Wideband Code Division Multiple Access (WCDMA), the first subscription can be in the Cell Forward Access Channel (CELL_FACH) state in the order of minutes (depending, e.g., on network parameters) before transiting to an idle state. During this time, the second subscription may not be used. However, from a user's point of view, substantially no differences between the CELL_FACH state and an "idle state" are perceivable.

One naïve approach to solve this problem may reside in providing two transceiver chains in the dual SIM device and in assigning one chain to each subscription. However, this is not a cost efficient solution.

SUMMARY

There is a need for a more efficient activity states management for a multi SIM terminal device.

In a first aspect, a method for managing activity states of at least two subscriptions in a terminal device is provided, wherein the method is performed in the terminal device and comprises the steps of monitoring whether a first subscription is to transit or has transit from a first active state to a second active state while at least one second subscription is in a detached state, wherein the second active state is associated with a lower terminal activity than the first active state, if the result of the monitoring step is affirmative, waiting for a predetermined period of time, upon elapse of the predetermined period of time, if the first subscription is still in the second active state, triggering a transition of the first subscription from the second active state to an inactive state and initiating for the at least one second subscription a transition from the detached state to an inactive state.

As an example, the second active state may correspond to a lower power consumption of the terminal device. In addition or alternatively, the second active state may correspond to an operational mode in which at least one or more components of the terminal device are temporarily switched off. In this manner, it is possible to save power and increase standby times of, for example, battery-operated terminal devices.

The second active state may be associated with at least one of transmission pauses and reception pauses, and the first active state has no pauses or is optionally associated with transmission and reception pauses shorter and/or less frequent than the corresponding pauses of the second active state. The transmission and reception pauses may be defined by discontinuous transmission and/or reception (DTX/DRX) modes. DTX and DRX modes are typically entered for power saving reasons.

In a first implementation, the terminal device may support at least one of WCDMA and High Speed Packet Access (HSPA), the first active state may be a Cell Dedicated Channel (CELL_DCH) state, and the second active state may be one of the CELL_DCH state with a DRX cycle larger than a first threshold, and a CELL_FACH state. In this case, the CELL_DCH state for the first active state may have a DRX cycle lower than a second threshold. The second threshold may be identical with the first threshold.

In another implementation that may be combined with the first implementation, the terminal device may support Long Term Evolution (LTE), the first active state may be a Radio Resource Control Connected (RRC_connected) state, and the second active state may be the RRC_connected state with a DRX cycle larger than a first threshold. In this case, the RRC_connected state for the first active state may have a DRX cycle lower than a second threshold. Again, the second threshold and the first threshold, may be identical.

In all of the above cases, the transition from the second active state to the inactive state may comprise a connection release procedure for the first subscription. The inactive state may thus be a state corresponding to a released network connection. In addition or alternatively, in the initiating step, the transition from the detached state to the inactive state may comprise an idle mode setup procedure for the at least one second subscription. In the latter case, the idle mode setup procedure may comprise at least one of a public land mobile network (PLMN) scan and a cell search. Accordingly, state transition of the subscription may easily be implemented by means of well-defined procedures.

Further, the inactive state may be any idle state such as at least one of a URA_PCH state and an idle mode in WCDMA. URA_PCH stands for UTRAN Registration Area Paging Channel, UTRAN stands for UMTS Terrestrial Radio Access Network, and UMTS stands for Universal Mobile Telecommunications System. Further, in LTE, the inactive state may be a Radio Resource Connected (RRC_idle) state. In the idle state or, more generally, in the inactive state, a paging channel may be monitored by the terminal device (e.g., for cell-related information). In this case, a DRX cycle of the terminal device for the inactive state may be selected (e.g., in the order of seconds such as 0.1 s to 5 s) to enable a periodic monitoring.

Moreover, at least one of the first subscription and the at least one second subscription may be defined (or represented) by one of a SIM card and a soft SIM on the side of the terminal device. In a soft SIM scenario, the terminal device does not necessarily have to hold two physical SIM cards.

Still further, the terminal device may be part of a communication network, and if so, the detached state may be such that a core network part of the communication network has no information on the terminal device (e.g., of the respective subscription being associated with the terminal device). In other words, while the communication network may store subscription-related information, it may be agnostic as to the fact that the terminal device is turned on and/or includes a SIM card or soft SIM associated with the corresponding subscription.

In a second aspect, a computer program product is provided, the computer program product comprising program code portions for performing any of the method aspects disclosed herein when the computer program product is executed on one or more computing devices (e.g., on the terminal device presented herein). The computer program product may be stored on a computer readable recording medium.

In a third aspect, a terminal device capable of managing activity states of at least two subscriptions is provided, wherein the terminal device comprises a component adapted to monitor whether a first subscription is to transit or has transit from a first active state to a second active state while at least one second subscription is in a detached state, wherein the second active state is associated with a lower terminal activity than the first active state, a component adapted to wait, if the result of the monitoring component is affirmative, for a predetermined period of time, a component adapted to trigger, upon elapse of the predetermined period of time and if the first subscription is still in the second active state, a transition of the first subscription from the second active state to an inactive state, and a component adapted to initiate for the at least one second subscription a transition from the detached state to an inactive state.

It is to be noted that the terminal device may implement any of the technical details set forth for the method aspect hereinabove, and thus achieves the same advantages. In other words, the terminal device may comprise further components adapted to perform any of the method steps disclosed herein.

In a fourth aspect, a communication network is provided, the communication network comprising the terminal device presented herein, wherein the detached state is such that the communication network has no information on the respective subscription being associated with the terminal device (e.g., in relation to the respective subscription the terminal device may appear turned off).

The terminal device may be a mobile or a stationary terminal. As an example, the terminal device may be realized in the form of a mobile telephone, a network or data card or stick, a notebook computer, and so on.

BRIEF DESCRIPTION OF THE DRAWINGS

The embodiments of the present invention are described herein below with reference to the accompanying drawings, in which.

DETAILED DESCRIPTION

In the following description, for purposes of explanation and not limitation, specific details are set forth (such as particular signalling steps) in order to provide a thorough understanding of the technique presented herein. It will be apparent to one skilled in the art that the present technique may be practised in other embodiments that depart from these specific details. For example, while the embodiments will primarily be described in the context of dual SIM terminals, it will be evident that the technique presented herein can also be practised in connection with other terminals carrying, for instance, three or more (soft) SIMs.

Moreover, those skilled in the art will appreciate that the services, functions and steps explained herein below may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Figure 1A:
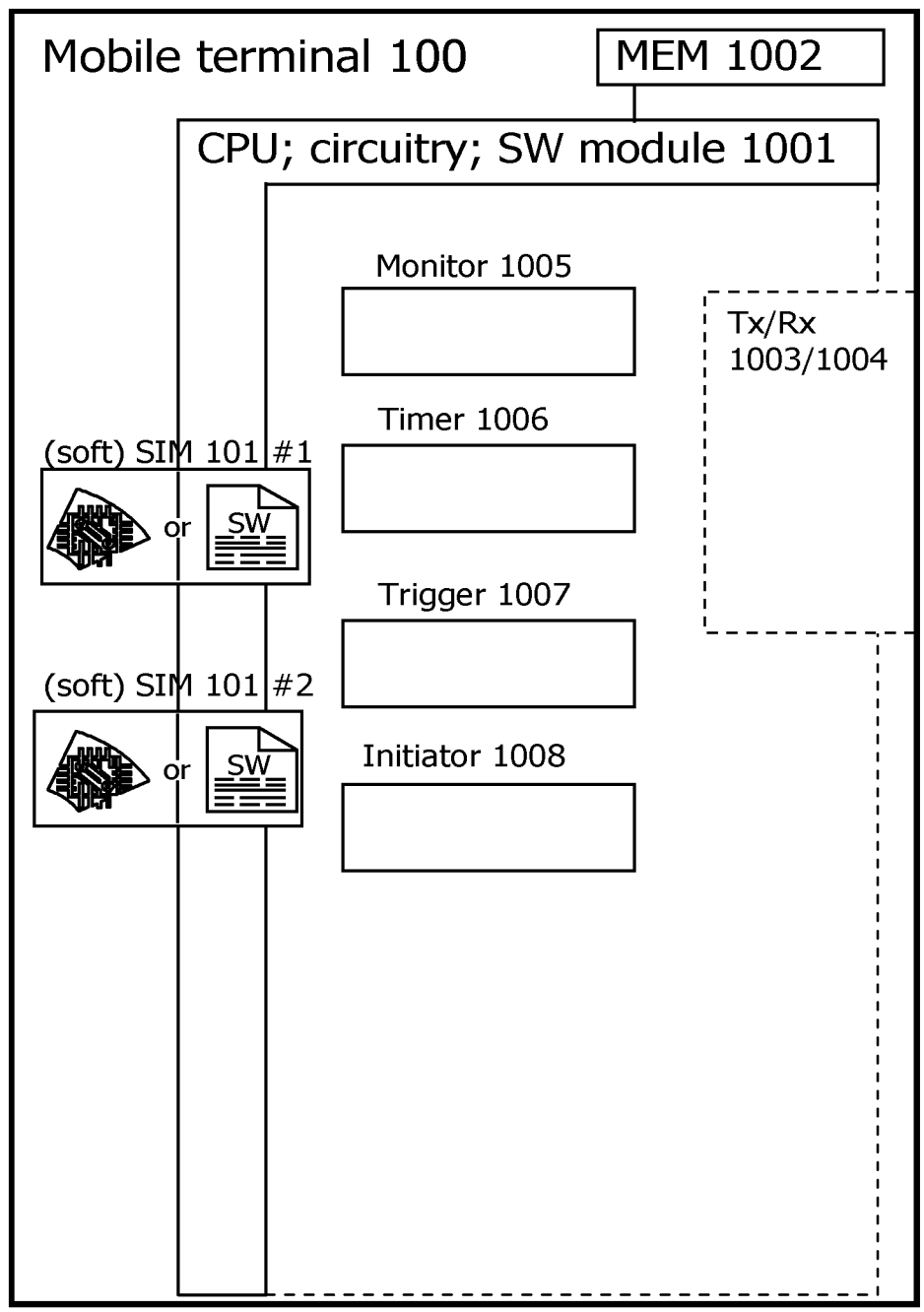
FIG. 1A shows the components comprised an embodiment of a mobile terminal.
Figure 1B:
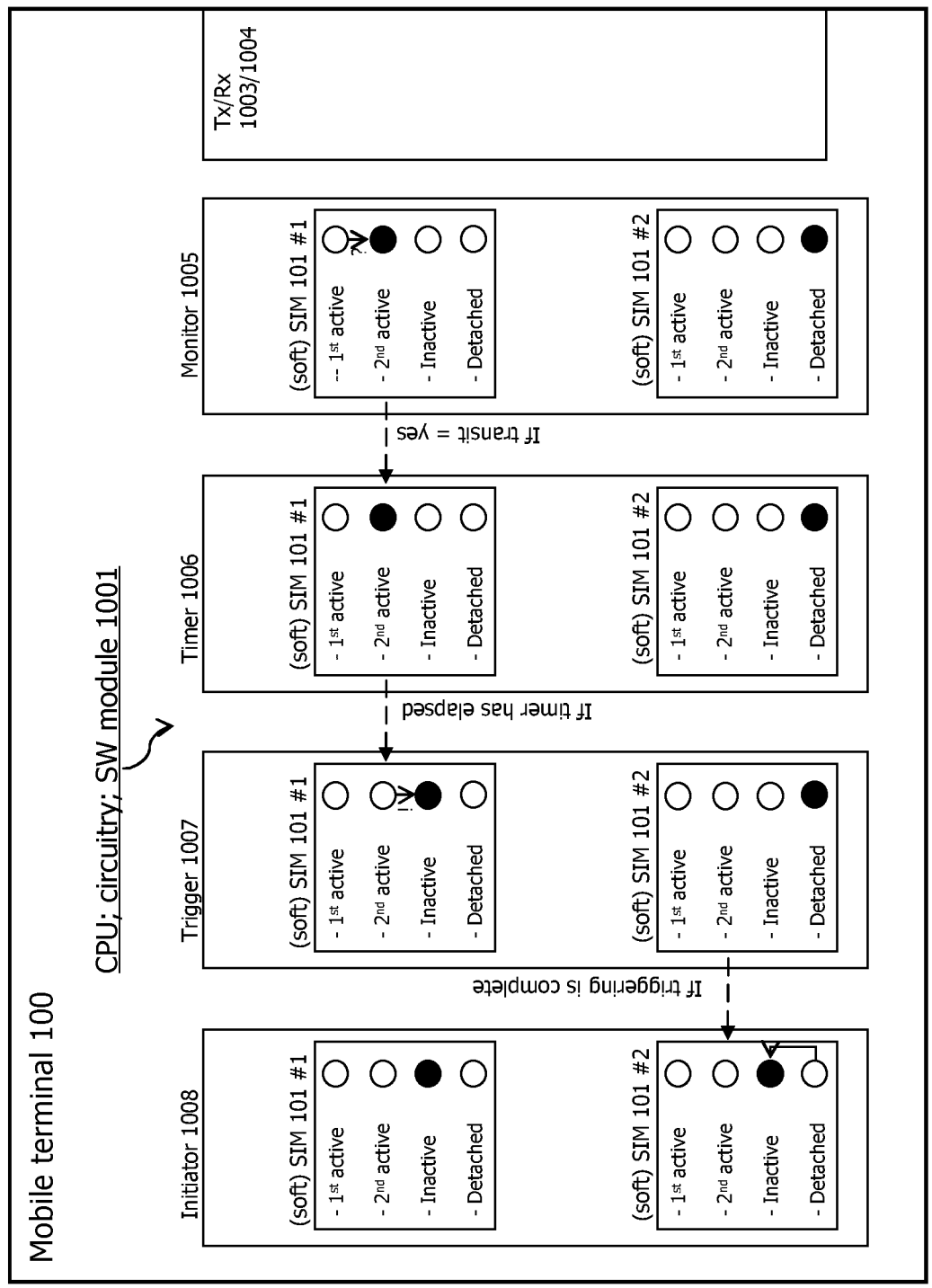
FIG. 1B shows the interaction between the components of the mobile terminal of FIG. 2A.

FIGS. 1A and 1B show an embodiment of a dual SIM terminal device 100 (here: a mobile terminal) for managing activity states of at least two subscriptions. FIG. 1A illustrates the components comprised in the mobile terminal 100, and FIG. 1B shows the interaction between the components of the mobile terminal 100.

As shown in FIG. 1A, the mobile terminal 100 comprises a first (#1) (soft) SIM 101 and a second (#2) (soft) SIM 101 associated with a first subscription and a second subscription, respectively, a core functionality (e.g. a central processing unit (CPU), a dedicated circuitry or a software module) 1001, a memory (and/or database) 1002, a transmitter 1003, a receiver 1004, a monitor 1005, a timer 1006, a trigger 1007, and an initiator 1008.

As indicated by the dashed extension of the functional block of the CPU 1001, the monitor 1005, the timer 1006, the trigger 1007, and the initiator 1008 (as well as the transmitter 1003 and/or the receiver 1004) may at least partially be functionalities running on the CPU 1001, or may alternatively be separate functional entities or means controlled by the CPU 1001 and supplying the same with information.

The CPU 1001 may be configured, for example by software residing in the memory 1002, to process various data inputs and to control the functions of the memory 1002, the transmitter 1003 and the receiver 1004 (as well as the monitor 1005, the timer 1006, the trigger 1007, and the initiator 1008). The memory 1002 may serve for storing code means for carrying out the methods according to the aspects disclosed herein, when run on the CPU 1001.

It is to be noted that the transmitter 1003 and the receiver 1004 may alternatively be provided as an integral transceiver, as is shown in FIGS. 1A and 1B. It is further to be noted that the transmitters/receivers may be implemented as physical transmitters/receivers for transceiving via an air interface (e.g., between the mobile terminal 100 and a serving access network), as routing entities (e.g., for transmitting/receiving data packets), as functionalities for writing/reading information into/from a given memory area, as interfaces between network elements, or as any suitable combination of the above. At least one of the above-described components for monitoring 1005, for waiting (or timing) 1006, for triggering 1007, and for initiating 1008, as well as the entire mobile terminal 100, or the respective functionalities carried out, may also be implemented as a chipset, module or subassembly.

Figure 2:
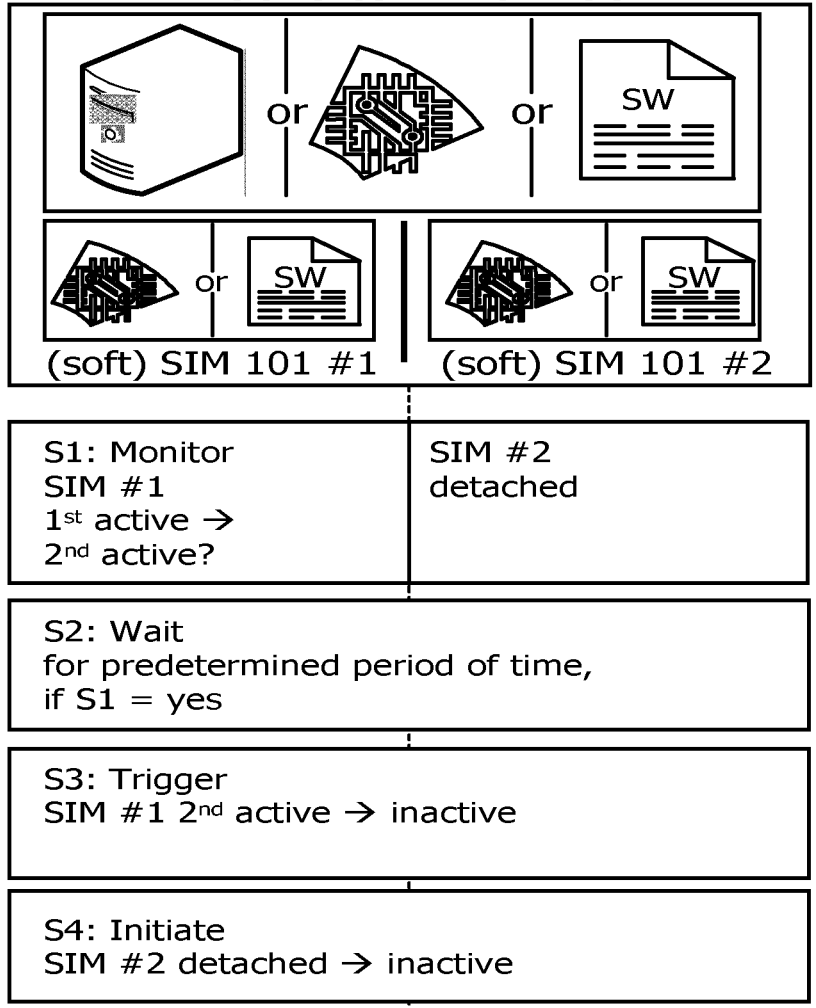
FIG. 2 shows a method embodiment for managing activity states of at least two subscriptions in a mobile terminal.

FIG. 2 illustrates an embodiment of a method for managing activity states of the two (or more) subscriptions by the mobile terminal 100 in a cellular network 10. As stated above, the mobile terminal 100 comprises the first (soft) SIM 101 #1 defining a first subscription and the second (soft) SIM 101 #2 defining a second subscription.

In the signalling diagram of FIG. 2, signalling between elements is indicated in the horizontal direction, while time aspects between signalling are reflected in the vertical arrangement of the signalling sequence as well as in the sequence numbers. It is to be noted that the time aspects indicated in FIG. 2 do not necessarily restrict any one of the method steps shown to the step sequence outlined in FIG. 2. This applies in particular to method steps that are functionally disjunctive with each other.

Referring still to the signalling diagram of FIG. 2 (to be read along with the mobile terminal shown in FIGS. 1A and 1B), in step S1, the monitor 1005 monitors whether the first subscription is to transit or has transit from a first active state to a second active state while the second subscription is in a detached state, wherein the second active state is associated with a lower terminal activity than the first active state.

As mentioned above, the first active state is optionally associated with transmission and reception pauses (e.g., DTX/DRX pauses) shorter and/or less frequent than the corresponding pauses of the second active state. Accordingly, the second active state may also be associated with at least one of transmission pauses and reception pauses. In addition or alternatively, the second active state may correspond to a lower power consumption of the mobile terminal 100. As a further alternative, the second active state may correspond to at least temporarily switching off one or more (e.g., receiver or transmitter) components of the mobile terminal 100. That is, it may not be desirable to keep a subscription in the first active state for long (e.g., due to energy consumption characteristics of the mobile terminal 100), and the second active state may be preferred if inactivity of the respective subscription is not (yet) possible or desired.

Then, in step S2, the timer 1006 controls the mobile terminal 100 to wait for a predetermined period of time if the result of the monitoring step is affirmative. Further, upon elapse of the predetermined period of time, and if the first subscription is still in the second active state, the trigger 1007 triggers a transition of the first subscription from the second active state to an inactive state.

Consequently, after the first subscription transits from the first to the second active state, the second active state is not kept for long (e.g., in the order of minutes). This is because also the second active state may not be desirable, for example due to user experience, since the second active state exhibits, from the user's point of view, the same properties as an inactive state, and therefore, the user is given the impression that his/her mobile terminal 100 is "idling" while the user wishes to use either the "idling" or another subscription. In a worst case, an inexperienced user may even draw the wrong conclusion that the mobile terminal 100 has crashed, i.e. has shut down its operation.

In this context, the inactive state may be a URA_PCH state or an idle mode (in WCDMA) In LTE, the inactive state may be an RRC_idle state. Still further, in the idle state, the paging channel may be monitored by the mobile terminal 100 for cell-related information. In this case, the DRX cycle for the idle state may be 1 to 2 seconds to allow for a periodic monitoring of the paging channel.

Thus, in the triggering step, the transition from the second active state to the inactive state may comprise a connection release procedure for the first subscription. That is, from the user's point of view, the "idling" period of the mobile terminal 100 is shortened, since the first subscription is forced into the inactive state after the predetermined period of time has elapsed. In this way, the user experience is improved, since the user is accustomed to short "setup periods". In addition, a short waiting period prevents the user from drawing the above wrong conclusion of a mobile terminal crash.

Finally, in step S4, the initiator 1008 initiates, for the second subscription, a transition from a detached state to an inactive state. As mentioned above, the mobile terminal 100 may be part of a communication network, and if so, the detached state may be such that the communication network does not "know" the terminal or its association with the respective subscription. In other words, the terminal may appear "turned off". In this context, in the initiating step, the transition from the detached state to the inactive state may comprise an idle mode setup procedure for the at least one second subscription. In this case, the idle mode setup procedure may comprise at least one of a PLMN scan and a cell search.

As a consequence, not only is the first subscription forced into an inactive state in a timely fashion, but also the second subscription is "invoked" from the detached state to the inactive state. Accordingly, both the user experience and the mobile terminal efficiency are improved, since the user does not have to trigger the transition of the second subscription himself/herself. On the contrary, right after the first subscription has transited to "inactive", the second subscription is brought to "inactive", i.e., the second subscription may have at least basic information, for example on the cell it PLMN camps on. That is, from the user's point of view, the (at least one) second subscription (or SIM) stands by at the time the user wants to use it. Accordingly, the user is saved both time and effort. However, the user may also re-use the first subscription (which is also in the inactive state) and has thus also basic information (e.g., on the cell it camps on). Thus, the user is given maximum flexibility in his/her decision on which subscription to use.

As mentioned above, the mobile terminal 100 may support WCDMA/HSPA, in which case the first active state may be a CELL_DCH state, and the second active state may be the CELL_DCH state with a DRX cycle larger than a first threshold or a CELL_FACH state. The CELL_DCH state for the first active state may have a DRX cycle lower than a second threshold. Accordingly, the mobile terminal 100 can attain the described advantages also in a code-division and/or packet-switched environment.

As further mentioned above, the mobile terminal 100 may support LTE, in which case the first active state may be an RRC_connected state, and the second active state may be the RRC_connected state with a DRX cycle larger than a first threshold. The RRC_connected state for the first active state may have a DRX cycle lower than a second threshold. That is, the mobile terminal 100 can attain the described advantages also in an upward-compatible way.

As has become apparent from the embodiments described hereinabove, the technique presented herein brings about one or more of the following advantages. The mobile terminal 100 can transit as fast as possible to the inactive or idle mode once a data or any other session is over, implying faster use of the second (or any other) subscription, and thus significantly improving the user experience. Moreover, multiple physical SIM cards or soft SIMs (i.e., SIM information stored in software) can be managed.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for managing activity states of at least two subscriptions in a terminal device, wherein the method is performed in the terminal device and comprises:
    monitoring whether a first subscription is to transit or has transited from a first active state to a second active state while at least one second subscription is in a detached state, wherein the second active state is associated with a lower terminal activity than the first active state and the second active state corresponds to a lower power consumption of the terminal device than the first active state;
    if the result of the monitoring step is affirmative, waiting for a predetermined period of time; and
    upon lapse of the predetermined period of time, if the first subscription is still in the second active state, triggering a transition of the first subscription from the second active state to an inactive state and initiating for the at least one second subscription a transition from the detached state to an inactive state.

2. The method according claim 1, wherein the second active state is associated with at least one of transmission pauses and reception pauses, and wherein the first active state is optionally associated with transmission and reception pauses shorter and/or less frequent than the corresponding pauses of the second active state.

3. The method according to claim 1, wherein:
    the terminal device supports at least one of Wideband Code Division Multiple Access (WCDMA) and High Speed Packet Access (HSPA);
    the first active state is a Cell Dedicated Channel (CELL_DCH) state; and
    the second active state is one of the CELL_DCH state with a discontinuous reception (DRX) cycle larger than a first threshold, and a Cell Forward Access Channel (CELL_FACH) state.

4. The method according to claim 3, wherein the CELL_DCH state for the first active state has a DRX cycle lower than a second threshold.

5. The method according to claim 1, wherein:
    the terminal device supports Long Term Evolution (LTE);
    the first active state is a Radio Resource Control Connected (RRC_connected) state; and
    the second active state is the RRC_connected state with a discontinuous reception (DRX) cycle larger than a first threshold.

6. The method according to claim 5, wherein the RRC_connected state for the first active state has a DRX cycle lower than a second threshold.

7. The method according to claim 1, wherein:
    in the triggering step, the transition from the second active state to the inactive state comprises a connection release procedure for the first subscription; and/or
    in the initiating step, the transition from the detached state to the inactive state comprises an idle mode setup procedure for the at least one second subscription.

8. The method according to claim 7, wherein the idle mode setup procedure comprises at least one of a public land mobile network (PLMN) scan and a cell search.

9. The method according to claim 1, wherein the inactive state is at least one of an RRC_idle, Radio Resource Connected, state in Long Term Evolution (LTE), a URA_PCH state or an idle mode in Wideband Code Division Multiple Access (WCDMA), and an idle state, wherein URA_PCH stands for UTRAN Registration Area Paging Channel, UTRAN stands for UMTS Terrestrial Radio Access Network, and UMTS stands for Universal Mobile Telecommunications System.

10. The method according to claim 1, wherein at least one of the first subscription and the at least one second subscription is defined by one of a subscriber identity module (SIM) card and a soft SIM.

11. The method according to claim 1, wherein
    the terminal device is part of a communication network; and
    the detached state is such that the communication network has no information on the respective subscription being associated with the terminal device.

12. A non-transitory computer readable recording medium storing a computer program product comprising program code portions that, when executed by a terminal device, configures the terminal device to:
    monitor whether a first subscription is to transit or has transited from a first active state to a second active state while at least one second subscription is in a detached state, wherein the second active state is associated with a lower terminal activity than the first active state and the second active state corresponds to a lower power consumption of the terminal device than the first active state;
    if the result of the monitoring step is affirmative, wait for a predetermined period of time; and
    upon lapse of the predetermined period of time, if the first subscription is still in the second active state, trigger a transition of the first subscription from the second active state to an inactive state and initiate for the at least one second subscription a transition from the detached state to an inactive state.

13. A terminal device configured for managing activity states of at least two subscriptions, wherein the terminal device comprises:
    a component adapted to monitor whether a first subscription is to transit or has transited from a first active state to a second active state while at least one second subscription is in a detached state, wherein the second active state is associated with a lower terminal activity than the first active state and the second active state corresponds to a lower power consumption of the terminal device than the first active state;
    a component adapted to wait, if the result of the monitoring component is affirmative, for a predetermined period of time;
    a component adapted to trigger, upon lapse of the predetermined period of time and if the first subscription is still in the second active state, a transition of the first subscription from the second active state to an inactive state; and
    a component adapted to initiate for the at least one second subscription a transition from the detached state to an inactive state.

14. The terminal device according to claim 13, wherein the second active state is associated with at least one of transmission pauses and reception pauses, and wherein the first active state is optionally associated with transmission and reception pauses shorter and/or less frequent than the corresponding pauses of the second active state.

15. The terminal device according to claim 13, wherein:
the terminal device is configured to support at least one of Wideband Code Division Multiple Access (WCDMA) and High Speed Packet Access (HSPA);
the first active state is a Cell Dedicated Channel (CELL_DCH) state; and
the second active state is one of the CELL_DCH state with a discontinuous reception (DRX) cycle larger than a first threshold, and a Cell Forward Access Channel (CELL_FACH) state.

16. The terminal device according to claim 15, wherein the CELL_DCH state for the first active state has a DRX cycle lower than a second threshold.

17. The terminal device according to claim 13, wherein:
the terminal device is configured to support Long Term Evolution (LTE);
the first active state is a Radio Resource Control Connected (RRC_connected) state; and
the second active state is the RRC_connected state with a discontinuous reception (DRX) cycle larger than a first threshold.

18. The terminal device according to claim 17, wherein the RRC_connected state for the first active state has a DRX cycle lower than a second threshold.

19. The terminal device according to claim 13, wherein:
the terminal device is further adapted to perform the transition from the second active state to the inactive state by a connection release procedure for the first subscription, and/or
the terminal device is further adapted to initiate the transition from the detached state to the inactive state by an idle mode setup procedure for the at least one second subscription.

20. The terminal device according to claim 19, wherein the idle mode setup procedure comprises at least one of a public land mobile network (PLMN) scan and a cell search.

21. The terminal device according to claim 13, wherein the inactive state is at least one of an RRC_idle, Radio Resource Connected, state in Long Term Evolution (LTE) a URA_PCH state or an idle mode in Wideband Code Division Multiple Access (WCDMA) and an idle state, wherein URA_PCH stands for UTRAN Registration Area Paging Channel, UTRAN stands for UMTS Terrestrial Radio Access Network, and UMTS stands for Universal Mobile Telecommunications System.

22. The terminal device according to claim 13, wherein at least one of the first subscription and the at least one second subscription is defined by one of a subscriber identity module (SIM) card and a soft SIM.

\* \* \* \* \*